United States Patent [19]

Fuller

[11] Patent Number: 4,929,045
[45] Date of Patent: May 29, 1990

[54] METHOD AND APPARATUS FOR ALIGNING OPTICAL ENERGY TO A WAVE GUIDE

[75] Inventor: Terry A. Fuller, Highland Park, Ill.

[73] Assignee: Fuller Research Corporation, Vernon Hills, Ill.

[21] Appl. No.: 252,171

[22] Filed: Sep. 29, 1988

[51] Int. Cl.⁵ .............................................. G02B 6/42
[52] U.S. Cl. ............................... 350/96.15; 350/96.18
[58] Field of Search .................. 350/320, 96.15, 96.18, 350/96.20, 96.21, 96.22; 250/205, 227; 356/73.1, 127, 138, 152

[56] References Cited

U.S. PATENT DOCUMENTS

| | | | |
|---|---|---|---|
| 4,215,937 | 8/1980 | Borsuk | 356/73.1 |
| 4,265,511 | 5/1981 | Nicia et al. | 350/96.18 |
| 4,289,398 | 9/1981 | Robichaud | 356/73.1 |
| 4,290,667 | 9/1981 | Chown | 350/96.18 |
| 4,319,839 | 3/1982 | Durran | 356/153 |
| 4,355,859 | 10/1982 | Herloski et al. | 350/6.1 |
| 4,451,115 | 5/1984 | Nicia et al. | 350/96.18 |
| 4,466,739 | 3/1984 | Kasner et al. | 356/138 |
| 4,523,843 | 6/1985 | Melman et al. | 356/127 |
| 4,530,602 | 7/1985 | Pomphrey, Jr. | 356/138 |
| 4,576,480 | 3/1986 | Travis | 356/152 |
| 4,673,290 | 6/1987 | Johnson et al. | 356/73.1 |
| 4,722,587 | 2/1988 | Thorsten | 350/96.20 |

Primary Examiner—Frank Gonzalez
Attorney, Agent, or Firm—Seidel, Gonda, Lavorgna & Monaco

[57] ABSTRACT

The method comprises inserting an optical detector into a movable holder, illuminating the optical detector by a source of optical energy to cause the detector to generate an output representative of intensity of illumination incident on the detector, moving a selected one of the source and holder to a position in which the output of the detector corresponds to maximum intensity of illumination, maintaining the moved one of the source and holder in said position and replacing the optical detector by a fiber optic to be aligned. The apparatus comprises a holder, a light source, and optical detector removably mounted in the holder for illumination by the light source, a circuit connected to output of the optical detector for determining when the output of the optical detector corresponds to maximum intensity of illumination, and means for moving a selected one of the holder and light source to a position in which the output of the detector corresponds to maximum intensity of illumination.

6 Claims, 2 Drawing Sheets

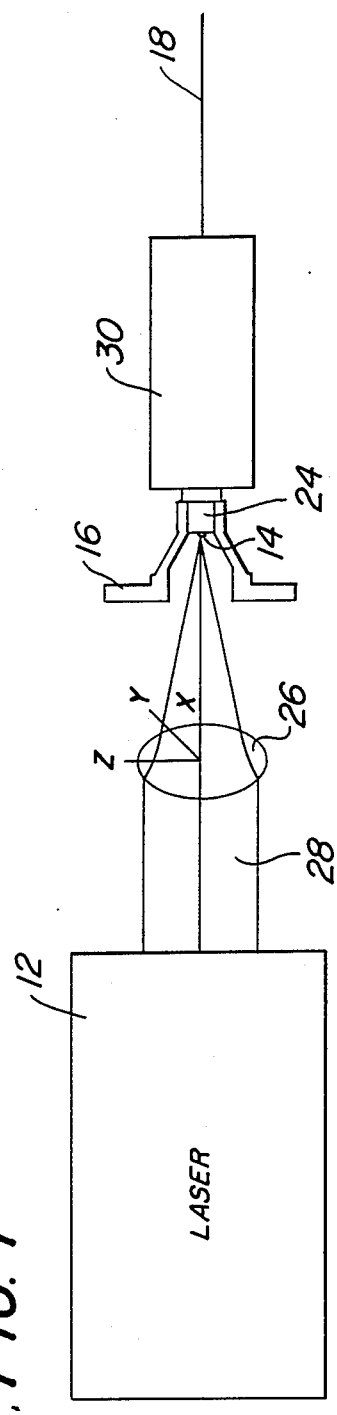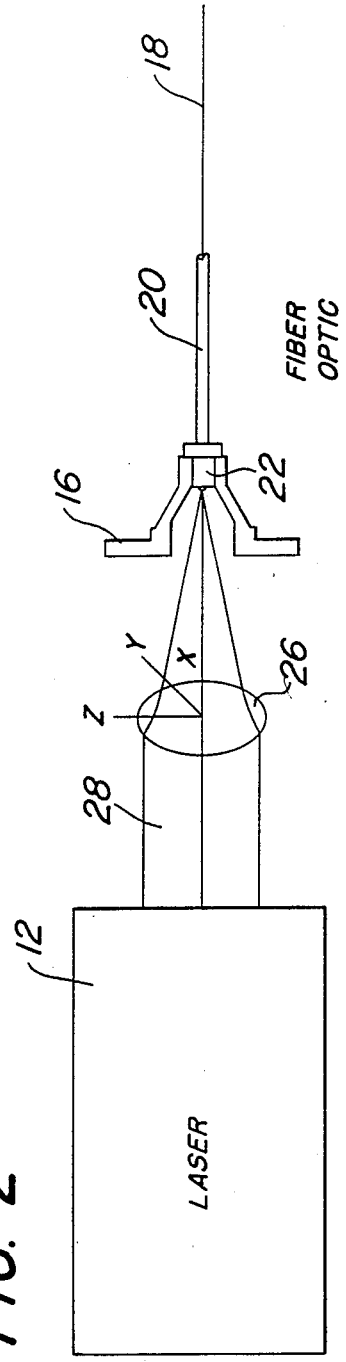

METHOD AND APPARATUS FOR ALIGNING OPTICAL ENERGY TO A WAVE GUIDE

BACKGROUND OF THE INVENTION

Fiber optics are increasingly being utilized to carry optical energy from a variety of sources. In communications, fiber optics carry pulsed modulated signals originating from laser diodes. In fiber optic sensors, they carry intensity and wavelength information indicating the "sensed" substance. In industry, they are used to carry high power laser beams to cut and/or anneal materials. In laser surgery, fiber optics carry high power laser beams which cut and vaporize tissue.

In all cases, proper utilization of fiber optics requires precision optical alignment of the source of optical energy to the fiber optic. Depending upon the application, the light source may be a conventional laser, laser diode, LED, light source, or other fiber optic carrying optical energy. In many applications, the industry has standardized dimensional tolerances which permit easy alignment of the source to the fiber. This is true in the communications industry where the diode, fiber connections and components conform to precision standards. Such standards make connection and alignment of the source and fiber easy. Generally, however, other fields do not or cannot enjoy standardization between source and fiber. This is the case in the coupling of conventional lasers and fiber optics for industrial, medical and many sensing applications.

The alignment of non-standard components, or components in which the source can move from connection to connection (such as with articulating arms), has required costly time consuming methods and highly trained personnel. These techniques have required a stable optical bench or surface in which to establish reference points for optical instruments, sensitive and frequently costly detectors to measure the irradiance of the optical sources, apertures to block unwanted radiation, and precision manipulators to move components with respect to each other in order to obtain the desired alignment. In addition to the costly, time consuming and sensitive set up when such techniques are utilized, detectors and associated instrumentation frequently do not permit measuring the optical source at its point of focus. This occurs because of the physical size of the available detector. This is particularly true when the source focal point is located within an aligning collar. The fiber optic is held within the alignment pin. It is at the base of the alignment collar (where the beam is focused) that one wishes to place, and thus align, the optical fiber. Accordingly, there is a need for a device which will easily and inexpensively optically align the source and a fiber optic.

Solid state photo diodes are used almost exclusively for fiber optic power meter detectors. The small sensing area permits accurate locating of the optical beam. They are also used because the optical bandwidth is in the region of most popularly used fiber optics. Communication fiber optics and associated instruments have, and remain, the mainstay of the optical fiber industry. The optical wavelengths detected by solid state photo diodes include: silicon, 400–1100 microns; germanium 800–1800 microns; indium gallium arsenide, 900–1800 microns; mercury cadmium telluride, 1000–1300 microns. These detectors can typically measure total power in the range of one picowatt to tens of milliwatts. The active area of the detector can range from as small as $10^{-3}$ square millimeters for some mercury cadmium telluride detectors to fractions of a millimeter for germanium and silicon detectors to areas as large as several square centimeters for detector arrays.

Detectors for measuring high power and/or longer wavelength sources are generally in themselves not directly suitable for precision alignment of focused optical beams to fiber optics. Such transducers include thermopiles and pyroelectric detectors. These devices are generally larger, with active areas much greater than the beam and fiber diameters. Precision apertures which mask all but one small area of the detector must be used to restrict the active area of the detector. This clumsy, yet effective technique, is often employed for higher power and/or long wave length applications.

SUMMARY OF THE INVENTION

The present invention is a method of and apparatus for optically aligning a radiant energy source to an optical wave guide such as a fiber optic. It comprises an inexpensive, durable and easy to use beam sensing means for generating a signal responsive to the appropriate optical alignment of the beam, both co-axially and at the optical center of the wave guide.

The method of the invention comprises the steps of inserting an optical detector into a movable holder, illuminating the optical detector by a source of optical energy to cause the detector to generate an output representative of intensity of illumination incident on the detector, moving a selected one of the source and holder to a position in which the output of the detector corresponds to maximum intensity of illumination, maintaining the moved one of the source and holder in said position and replacing the optical detector by a fiber optic to be aligned.

The apparatus of the invention comprises a holder, a light source, an optical detector removably mounted in the holder for illumination by the light source, a circuit connected to output of the optical detector for determining when the output of the optical detector corresponds to maximum intensity of illumination, and means for moving a selected one of said holder and light source to a position in which the output of the detector corresponds to maximum intensity of illumination.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 illustrates in simplified form a fiber optic alignment device in accordance with the present invention.

FIG. 2 illustrates in simplified form a fiber optic after alignment with a light source in the form of a laser.

DESCRIPTION OF THE INVENTION

Figures 3, 4:
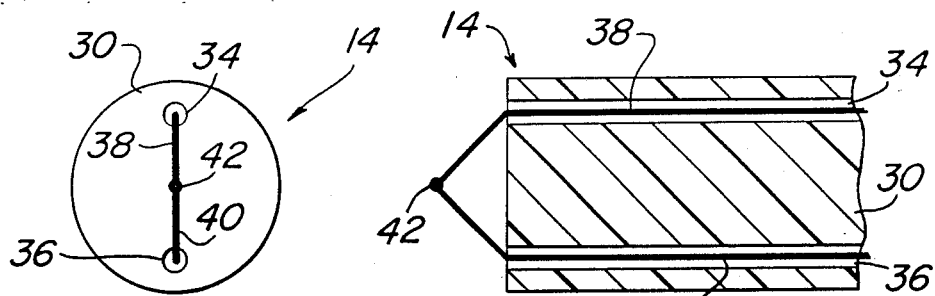
FIG. 3 illustrates in simplified form a detector, in the form of a thermocouple, for the alignment device of FIG. 1.
FIG. 4 is a side view of the thermocouple shown in FIG. 3.

Referring now to the drawings wherein like numerals indicate like elements, there is shown in FIG. 1 a fiber optic alignment apparatus 10 according to the present invention. The invention 10 is shown used in conjunction with a light source 12 in the form of a laser, but it is understood that any source of light may be used without departing from the invention. A small inexpensive detector 14, such as a thermocouple, is held in an alignment collar 16 at the alignment axis 18 of the fiber optic 20. As shown in FIGS. 1 and 2, the alignment axis 18 of the fiber alignment device and the fiber optic are interchangeable.

In the illustrated embodiment there is shown in FIG. 2 a cylindrical fiber optic 20 mounted within a cylindrical alignment pin 22. Such geometry is commonplace. It should be understood, however, that any geometry of locating a fiber optic within an alignment pin is within the scope of the invention. In this cylindrical geometry, detector 14 is accurately aligned within an alignment pin 24 identical to alignment pin 22. Detector 14 and alignment pin 24 can be easily and accurately fabricated and located in alignment collar 16 using a magnifying lens, microscope or mechanical alignment sleeve. The detector/pin assembly can then be simply inserted into alignment collar 16 in a manner identical to inserting the fiber optic 20. An X, Y, Z manipulator, which permits the alignment, can now be adjusted. As those skilled in the art will understood, the X, Y, Z manipulator permits an optical element to be translated along the X, Y, and Z axes, as shown in FIGS. 1 and 2. The manipulator is selectably located on the laser 12, lens 26 or alignment collar 16, as desired. As shown in FIGS. 1 and 2, the lens is manipulated although laser 12 or alignment collar 16 could be manipulated without departing from the invention. The X, Y, Z manipulator is adjusted to move the beam 28 from laser 12 until a signal is observed from detector 14. The signal from detector 14 may be fed into a signal conditioning circuit 30 preferably, but not necessarily, containing a logarithmic amplifier.

In the disclosed system, the sensitivity of the fiber alignment device is sufficiently large to permit alignment of a laser beam initially far from the center of the alignment axis. The use of a logarithmic amplifier, or a combination of linear and logarithmic amplifiers, permits detection of small signals as well as very large signals without saturating the amplifier. This scheme permits excellent sensitivity over a large range of signals, particularly such as those from a Gaussian or near-Gaussian laser beam.

A preferred form of detector 14 is shown in somewhat greater detail in FIGS. 3 and 4. Detector 14 comprises an alignment pin 32 which is preferably a ceramic, but may be any other suitable material. Pin 32 has two parallel longitudinal bores 34, 36 through which thermocouple wires 38, 40 are inserted. As with all thermocouples, wires 38 and 40 are of dissimilar metals. Wires 38 and 40 are joined at one end at junction 42 to form a thermocouple junction, while the opposite ends of wires 38 and 40 are connected to the input of signal conditioning circuit 30.

In the disclosed system, to use the fiber alignment device detector 14 is simply inserted into the alignment collar 16 in a manner identical to the fiber optic to be aligned. X, Y, Z manipulator is adjusted in either a sequential or non-sequential manner (although a sequential manner is recommended) until the output from the amplifier is at a maximum. To provide a convenient visible indication of amplifier output, the amplifier output can be connected to a series of light emitting diodes, or LEDs. The output of the amplifier is at a maximum when the largest number of LEDs driven from the amplifier is lit. When the maximum number of LEDs is lit, the optical axis of the laser 12 and alignment collar 16 are the same. The lens 26 is then locked into place, detector 14, pin 24 and circuit 30 are removed and the fiber optic 20 simply inserted into the alignment collar 16. This completes the alignment procedure.

The basic concept of the invention can be used for virtually any power level ranging from picowatts to tens of watts and for wavelengths ranging from the UV through IR, as long as an appropriate detector is selected.

In the visible and near infrared region of the spectrum, where the power is low (pico to milliwatts), solid state diodes can be used as detectors. For high power and/or long wave length applications (milliwatts to watts), the use of a single thermocouple can be used.

In all cases, the area of sensitivity of the detector must be smaller than the spot size of the incident beam and/or target area The sensitivity and accuracy of the system is determined by the power sensed by the detector in relationship to the beam intensity profile of the incident beam. The equation below summarizes the relationship, where Eo=peak beam intensities; Wo=beam waste; $W_{(z)}$=spot size at axial location, Z; and X, Y=detector size:

$$P_{det(z)} = \int_A \frac{E_o^2}{2} \cdot \frac{W_o^2}{W_{(z)}^2} \exp \frac{[-2(x^2 + y^2)]}{W_{(z)}^2} dxdy$$

In high power applications using thermocouples as detectors, the pin holding the thermocouple should be of such a geometry to limit an erroneous signal generated by energy absorbed by the pin and its subsequent radiation of heat. The radiant heat from the pin will reduce the sensitivity of the detector by increasing the environmental temperature, thus reducing the signal to noise ratio.

The present invention may be embodied in other specific forms without departing from the spirit or essential attributes thereof and, accordingly, reference should be made to the appended claims, rather than to the foregoing specifications, as indicating the scope of the invention.

I claim:

1. Method of aligning a source of optical energy and a fiber optic, comprising the steps of:
   (a) inserting an optical detector into a holder,
   (b) illuminating the optical detector by a source of optical energy to cause the detector to generate an output representative of intensity of illumination incident on the detector,
   (c) moving a selected one of the source and holder to a position in which the output of the detector corresponds to maximum intensity of illumination,
   (d) maintaining the moved one of the source and holder in said position and
   (e) replacing the optical detector by a fiber optic to be aligned.

2. Method of claim 1, wherein the step of moving a selected one of the source and holder comprises moving said selected one in at least one of three mutually orthogonal axes.

3. Method of claim 2, wherein the step of moving comprises moving said selected one first along a first axis, then along a second axes and last along a third axis of said mutually orthogonal axes.

4. Method of claim 1, wherein the step of illuminating comprises illuminating the optical detector through a focusing lens, and the step of moving comprises moving a selected one of the source, focusing lens and holder.

5. Apparatus for aligning a source of optical energy and a fiber optic, comprising:
  (a) a holder,
  (b) a light source,
  (c) an optical detector removably mounted in said holder for illumination by said light source,
  (d) a circuit connected to output of the optical detector for determining when the output of the optical detector corresponds to maximum intensity of illumination, and
  (e) means for moving a selected one of said holder and light source to a position in which the output of the detector corresponds to maximum intensity of illumination.

6. Apparatus according to claim 1, further comprising a focusing lens between the holder and the light source and means, for moving a selected one of the holder, focusing lens and light source to a position in which the output of the detector corresponds to maximum intensity of illumination.

* * * * *